UNITED STATES PATENT OFFICE.

OMAR T. JOSLIN, OF CHICAGO, ILLINOIS.

PROCESS OF MAKING FERTILIZER FROM TANK-WATER.

SPECIFICATION forming part of Letters Patent No. 495,043, dated April 11, 1893.

Application filed August 19, 1892. Serial No. 443,520. (No specimens.)

*To all whom it may concern:*

Be it known that I, OMAR T. JOSLIN, a citizen of the United States, residing at Chicago, in the county of Cook and State of Illinois, have invented certain new and useful Improvements in Processes of Treating Tank-Waters, of which the following is a specification.

My invention relates to processes of treating tank waters to recover their nitrogenous constituents in suitable form for use as commercial fertilizers. As the product resulting from the evaporation of the tank waters is exceedingly hygroscopic, it is necessary that some method of treatment should be adopted to render the product non-hygroscopic, in order to fit it for storage or transportation. Many methods have been devised for so treating tank waters as to render the product non-hygroscopic, but such methods in general have resulted in lowering the percentage of nitrogenous matter in the finished product by the addition of inert matter.

The object of my invention is to provide a new and improved process of treating tank waters, in which the percentage of nitrogenous matters in the product will be maintained at the highest possible point, and in which the danger of decomposing the albumenoids found in the tank waters will be avoided. I accomplish this object as follows: The tank waters are first reduced to a sirupy condition by evaporation, to which sirup is then added a small percentage,—preferably from five to ten per cent.—of calcic tetra hydrogen phosphate, preferably an aqueous solution. Instead of the calcic tetra hydrogen phosphate a larger portion of calcic dihydrogen phosphate may be used. The calcic phosphates above mentioned act to alter the constitution of the sirup and precipitate certain albuminous matters. To the compound thus formed is then added from five to thirteen per cent. of concentrated solutions of aluminum, iron, magnesium and calcium, approximately in the following proportions: twelve per cent. ferric oxide; fifteen per cent. aluminum oxide; three per cent. calcium oxide; three per cent. magnesium oxide. I obtain this mixture by dissolving waste fuller's earth in sulphuric acid, filtering off the insoluble silica, and evaporating the resulting solution of sulphates. The resulting product is then dried in pans placed in suitable ovens, which are heated to from 300° to 350°. The dried mass is then ground to a powder, when it is ready for use.

If desired, instead of using the sulphate solution alone, as above described, from twenty to forty per cent. of ground tankage, hoofs, horn, hair, or pressed cooked blood may also be added, and in such case a still smaller proportionate amount of the sulphate solution may be used.

As the calcium phosphates are in themselves valuable fertilizing agents, their addition to the tank waters increases the value of the product as a fertilizer, instead of diminishing its value, as the percentage of inert matter is diminished. The decomposition of the sirup resulting from the addition of the phosphates so alters its nature that a smaller proportion of the sulphate solution is necessary; and although the compounds which compose the sulphate solution have a fertilizing value in themselves, it is desirable that the amount introduced should be as small as possible so that the percentage of ammoniates or nitrogenous compounds will be greater.

In my application, Serial No. 407,004, filed September 28, 1891, I have described a process in some respects similar to that set forth in my present application, the principal difference being the use of sulphuric or muriatic acid instead of the phosphates of calcium used in my present process. The advantage of the use of the phosphates of calcium rather than mineral acids lies in the fact that if the mineral acids are added in excess they are apt to decompose the albumenoids in the tank waters, thereby forming more sticky products than the original ones; and because of the fact that the percentage of the acid albumen is variable, more or less care is required to avoid adding an excess. By the use of the acid phosphates of calcium this objection is avoided, for the reason that they do not act to decompose the albumenoids even though added moderately in excess.

That which I claim as my invention, and desire to secure by Letters Patent, is—

1. The process of treating tank waters which consists in adding an acid phosphate of calcium, then adding a solution formed by dissolving waste fuller's earth in sulphuric acid, and then drying the product, substantially as specified.

2. The process of treating tank waters which consists in adding from five to ten per cent. of an acid phosphate of calcium, then adding from five to thirteen per cent. of a concentrated solution formed by dissolving waste fuller's earth in sulphuric acid, and then drying the product, substantially as specified.

3. The process of treating tank waters which consists in adding an acid phosphate of calcium, then adding a concentrated solution formed by dissolving waste fuller's earth in sulphuric acid, then adding an absorbent, as pressed cooked blood, and then drying the product, substantially as specified.

OMAR T. JOSLIN.

Witnesses:
JOHN L. JACKSON,
ALBERT H. ADAMS.